United States Patent [19]
Terada et al.

[11] 3,939,290
[45] Feb. 17, 1976

[54] WATER IN OIL EMULSION

[75] Inventors: Kimio Terada; Satoshi Fujita; Shigeru Oinuma; Hiroshige Kohno, all of Tokyo, Japan

[73] Assignee: Asahi Denka Kogyo Kabushiki Kaisha, Japan

[22] Filed: July 19, 1973

[21] Appl. No.: 380,734

[30] Foreign Application Priority Data
July 21, 1972 Japan............................ 47-72495

[52] U.S. Cl................................. 426/564; 426/602
[51] Int. Cl.$^2$............................................ A23D 3/00
[58] Field of Search................. 260/234 R; 252/312; 426/362, 363, 339, 340, 194, 201, 202, 189, 602, 603, 604, 605, 606, 607, 609, 613, 564, 570

[56] References Cited
UNITED STATES PATENTS

| | | | |
|---|---|---|---|
| 2,114,490 | 9/1937 | Harris | 426/201 |
| 2,223,558 | 12/1940 | Epstein | 426/189 |
| 2,422,633 | 6/1947 | Peterson | 260/234 R |
| 2,700,022 | 1/1955 | Clayton et al. | 260/234 R |
| 2,929,722 | 3/1960 | Schultz et al. | 426/201 |
| 2,999,023 | 9/1961 | Babayan et al. | 426/194 |
| 3,490,919 | 1/1970 | Moran | 426/189 |
| 3,519,436 | 7/1970 | Bauer et al. | 426/340 |
| 3,600,186 | 8/1971 | Mattson et al. | 426/194 |
| 3,682,656 | 8/1972 | Wilton | 426/189 |

*Primary Examiner*—Thomas G. Wyse
*Assistant Examiner*—Ernest G. Therkorn
*Attorney, Agent, or Firm*—Wenderoth, Lind & Ponack

[57] ABSTRACT

This invention relates to an edible emulsion which is stable during storage and carriage and the phases of which are reversed by mechanical working to form an oil-in-water type emulsion, containing a polyhydric alcohol fatty acid ester having a substantial proportion of a polyhydric alcohol fatty acid ester in an amount of about 0.25 – 2.5% by weight of said emulsion and a sucrose fatty acid ester having an HLB value of at least 10 in an amount of about 0.5 – 5% by weight of said emulsion.

5 Claims, No Drawings

WATER IN OIL EMULSION

In this specification, the terms "oil" and "fat" are used synonymously.

Generally, a reversal of phases of an emulsion is often confused with destruction of an emulsion, but in this specification, a reversal of phases of an emulsion is distinguished from destruction of an emulsion. When an oil-in-water type emulsion such as fresh cream is whipped excessively, the aqueous phase is separated from the oil phase. In this specification, this phenomenon is called "destruction" of an oil-in-water emulsion, but not a "reversal of phases" of an oil-in-water emulsion. Water-in-oil emulsion as used in butter and cosmetics is produced by initially preparing an oil-in-water emulsion and thereafter effecting the reversal of the phases by adding a further quantity of oil. In this case, the phases of the emulsion are reversed during production. The reversal of the emulsion in this case is distinct from the reversal of the phases in this invention. The former is accomplished during production, but the latter is effected during mechanical working, such as whipping, when the product is used for various purposes. In the above mentioned case, the water-in-oil emulsion is produced from the oil-in-water emulsion by reversal of the phases, but in this invention, the oil-in-water emulsion is produced from the water-in-oil emulsion by reversal of the phases. Moreover, in this invention, the phases of the emulsion are reversed without changing the appearance of the emulsion and without separation of the aqueous phase or the oil phase. The phases of the emulsion of this invention are reversed by mechanical working such as whipping, but they are not reversed simply by slightly agitating the emulsion. The whipping time required to reverse the phases of the emulsion depends on the kind of mixing machine, the mixing speed, the size of the dispersed droplets in the continuous phase, the fluidity of the emulsion and the water content of the emulsion, but generally it is from about 30 seconds – 3 minutes. When the emulsion is whipped, there is no necessity to add water, syrup or emulsifier to accelerate the phase reversion of the emulsion.

The human tongue is more sensitive to the taste of water-phase than of oil-phase. Therefore our tongues are more sensitive to the taste of an oil-in-water emulsion in which the outer continuous phase is water-phase than the taste of a water-in-oil emulsion or an oil-in-water-in-oil emulsion in which the outer continuous phase is oil-phase. However, bacteria contaminate the water phase more easily than the oil-phase and therefore the oil-in-water emulsion, in which outer continuous phase is water-phase, is more easily contaminated with bacteria during storage and carriage than the water-in-oil emulsion or the oil-in-water-in-oil emulsion in which the outer continuous phase is oil phase.

An object of this invention is to provide an edible emulsion which is stable and not contaminated easily with bacteria during storage and carriage and effects the phase inversion by whipping when the emulsion is used to produce oil-in-water emulsion, the taste of which is more readily detectable by the tongue.

The edible emulsion of this invention comprises a continuous oil phase and a dispersed aqueous phase the total amount of the continuous oil phase and being about 50 – 95% by weight of said emulsion, the amount of the dispersed aqueous phase being about 5 – 50% by weight of said emulsion, said emulsion containing a polyhydric alcohol fatty acid ester having a substantial proportion of a polyhydric alcohol unsaturated fatty acid ester in an amount of about 0.25 – 2.5% by weight of said emulsion and a sucrose fatty acid ester having an HLB value of at least 10 in an amount of about 0.5 – 5% by weight of said emulsion.

The method of preparing the edible emulsion of this invention comprises preparing the emulsion comprising (a) forming an emulsion which comprises a continuous oil phase and a dispersed aqueous phase in an aqueous phase, the total amount of the continuous oil phase being about 50 – 95% by weight of said emulsion, the amount of the dispersed aqueous phase being about 5 – 50% by weight of said emulsion, said emulsion containing a polyhydric alcohol fatty acid ester having a substantial proportion of a polyhydric alcohol unsaturated fatty acid ester in an amount of about 0.25 – 2.5% by weight of said emulsion and a sucrose fatty acid ester having an HLB value of at least 10 in an amount of about 0.5 – 5% by weight of said emulsion and (b) cooling rapidly the emulsion to effect solidification of components of the oil phase.

The sucrose fatty acid ester for use in the emulsions of this invention has an HLB value of at least 10, preferably 11 to 17 and it is composed primarily of monoester of sucrose and saturated and/or unsaturated fatty acid containing 12 to 22 carbon atoms, together with smaller amounts of diester and triester of them. The sucrose fatty acid ester contains monoester in an amount of at least 40% when the combined fatty acid is saturated and/or unsaturated fatty acid containing 12 carbon atoms and in an amount of at least 50% when the combined fatty acid is saturated fatty acid containing 16 carbon atoms and in an amount of at least 50% preferably at least 60% when the combined fatty acid is the mixture of fatty acid containing 12 to 22 carbon atoms. Even when the amount of monoester in the sucrose fatty ester is below 50%, the water-in-oil type emulsion or the oil-in-water-in-oil type emulsion can be prepared, but the phases of the prepared emulsion cannot be reversed by whipping to produce oil-in-water emulsion.

The amount of sucrose fatty acid ester having an HLB value of at least 10 is about 0.5% to about 5.0%, preferably about 1.0% to about 3.0% by weight of the prepared emulsion. When the amount of it is below about 0.5% by weight of the prepared emulsion, the phases of the prepared emulsion cannot be reversed by whipping to produce oil-in-water type emulsion. when the amount of the sucrose fatty acid ester is above about 5% by weight of the prepared emulsion, it spoils the taste of the prepared emulsion.

The amount of aqueous phase is from about 5% to about 50%, preferably from about 10% to about 40% by weight of the prepared emulsion. Even when the amount of aqueous phase is below about 5% by weight of the prepared emulsion, the phases of the prepared water in oil (w/o) or oil-in-water-in-oil (o/w/o) emulsion can be reversed to produce oil-in-water (o/w) type emulsion, but the reversed oil-in-water (o/w) emulsion is unstable because its aqueous phase is too small. When the amount of aqueous phase is above about 50% by weight of the prepared emulsion, the prepared (w/o) or (o/w/o) emulsion is unstable because its has too large an aqueous phase. The polyhydric alcohol fatty acid ester for use in the emulsions of this invention is composed primarily of monoester of polyhydric alcohol and fatty acid containing 12 to 22 carbon atoms selected from a group consisting of unsaturated fatty acid and a mixture of unsaturated fatty acid and saturated fatty acid, together with a smaller amount of their diester and triester. The combined fatty acid is composed primarily of unsaturated fatty acid and it may contain saturated fatty acid. When the amount of saturated fatty acid is larger than the amount of unsaturated fatty acid in the composition of the combined fatty acid, it is necessary to add a larger amount of the polyhydric alcohol fatty acid ester to the oil phase to prepare the emulsion, the phases of which can be reversed to oil-in-water type emulsion, thus spoiling the taste of the prepared emulsion. The preferred amount of unsaturated fatty acid is at least about 50% by weight of the combined fatty acid. When the polyhydric alcohol fatty acid ester comprising only the polyhydric alcohol saturated fatty acid ester is used, the phases of the prepared emulsion cannot be reversed to produce oil-in-water type emulsion.

The combined unsaturated fatty acid may be unsaturated fatty acid, such as myristoleic acid, 9-palmitoleic acid, oleic acid, linoleic acid, linolenic acid, gadoleic acid, arachidonic acid, erucic acid, preferably oleic acid, linoleic acid and linolenic acid. The combined polyhydric alcohol may be polyhydric alcohol such as glycerine, propylene glycol, sorbitol, sorbitan, sorbide and sucrose, preferably glycerine, propylene glycol and sorbitan.

The polyhydric alcohol fatty acid ester must include a polyhydric alcohol unsaturated fatty acid ester in an amount of 0.25% to 2.5% by weight of the prepared emulsion and the preferred amount of the polyhydric alcohol unsaturated fatty acid ester is about 0.5 to about 1.5% by weight of the prepared emulsion. Even when the amount of it is below about 0.25% by weight of the emulsion, the emulsion can be prepared but the phases of the prepared emulsion cannot be reversed by whipping to form oil-in-water type emulsion.

When the amount of it is above 2.5% by weight of the prepared emulsion, the phases of the prepared emulsion can be reversed by whipping but the prepared emulsion easily deteriorates in flavour during extended periods of time because it contains an unsaturated fatty acid group.

After the phases of the emulsion of this invention have been reversed to form an oil-in-water type emulsion, the polyhydric alcohol fatty acid ester containing mainly saturated fatty acid group may be added to the emulsion to improve the whipping properties of the prepared emulsion.

The fat for use in the emulsion of this invention can be any edible fat such as vegetable fat, animal fat, oil, treated fat obtained by treating the above materials in a chemical or physical method, or a mixture thereof.

Examples of the fats which may be used in this invention are milk fat, soybean oil, cottonseed oil, corn oil, safflower oil, palm oil, rapeseed oil, Kapok oil, coconut oil, butter fat, lard, tallow, fish oil, whale oil and the like, the hardened oil which is obtained by hydrogenating the above materials, and the mixture thereof.

If necessary, the emulsion in this invention may contain additives such as milk products flavoring materials, coloring materials stabilizing agents, thickening agents, spices and the like.

The method of preparing the edible emulsion of this invention is as follows. In order to prepare the water-in-oil (w/o) type emulsion of this invention, the aqueous phase comprising water and the sucrose fatty acid ester and the oil phase comprising the fat and the polyhydric alcohol fatty acid ester are mixed and emulsified at a temperature greater than the melting point of the fat used as the oil phase being generally about 40° to about 60°C, and then the resulting emulsion is rapidly cooled and plasticized to form a plastic emulsion containing dispersed particles of about 2 to 20 microns in size. The rapid cooling and plasticizing step may be performed by putting the emulsion in contact with a cooling drum or passing it through a tubular cooler. The process of preparing the emulsion of this invention may be conducted by using a device such as a "Votator", "Perfector", "Kombinator" or "Complector".

In order to prepare the oil-in-water-in-oil type emulsion, it is necessary to divide the oil phase for use in the emulsion of this invention into two parts. One part may be the same as the other or different from the other in its' composition. The fat for use in this invention is divided into two parts so that the outer oil phase may contain at least 20% and preferably at least 25% of the fat. In the above case, the polyhydric alcohol fatty acid ester containing the polyhydric alcohol unsaturated fatty acid ester may be added to the outer oil phase or the inner oil phase, preferably to the outer oil phase. The sucrose fatty acid ester having an HLB value of at least 10 may be adequate to prepare the oil-in-water emulsion from the inner oil phase and the aqueous phase but a water soluble protein such as casein is preferably added to the aqueous phase to improve the stability of the oil-in-water emulsion. The emulsification for preparing the oil-in-water emulsion may be accomplished by using individually or in combination such emulsification machines as a propeller type agitator, turbine type agitator homomixer and homogenizer. The emulsification temperature may be about 40°C – 90°C. The oil-in-water emulsion may be homogenized to form a particle of fat having a size not bigger than about 5 microns, preferably about 0.5 – 2 microns. Thereafter, the oil-in-water-in-oil emulsion is formed by dispersing the oil-in-water emulsion in the outer oil phase at a temperature greater than the melting point of the outer oil phase, preferably about 40°C – 60°C. The resulting mixture is cooled by passing it through a device for cooling and plasticizing to obtain an oil-in-water-in-oil type emulsion composition.

When the water-in-oil emulsion or the oil-in-water-in-oil emulsion is cooled rapidly and plasticized by a device for cooling and plasticizing, the operating condition of the device may be controlled to obtain a particle size for the dispersed phase of about 2 – 20 microns. However, it is difficult to exactly control the particle size of the dispersed phase only by controlling the operating condition of the device for cooling. In this invention, the particle size of the dispersed phase is substantially controlled by the amount of water in the emulsion. The particle size of the dispersed phase in the emulsion of this invention is about 2 – 20 microns, preferably 2 – 10 microns. When the particle size of the dispersed phase is below 2 microns, the phases of the emulsion cannot be reversed, and when the particle size of the dispersed phase is above 20 microns, the emulsion is unstable. In this invention, the particle size of the dispersed phase is controlled to 2 – 20 microns mainly by controlling the amount of aqueous phase to 5 – 50% by weight of the emulsion.

The product of this invention has various uses because of having the properties not only of a water-in-oil emulsion or an oil-in-water-in-oil emulsion but also of an oil-in-water emulsion. It may be used for various purposes as a unique emulsion which has both good storage and handling properties because it has an oil phase as an outer continuous phase, and good test since the phases change on whipping.

When the emulsion is used unchanged as a water-in-oil emulsion or as an oil-in-water-in-oil emulsion, there is no necessity to whip the emulsion, and when the emulsion is used as an oil-in-water emulsion, the emulsion is whipped to reverse the phases.

The emulsion of this invention can be produced only by utilizing both a specified amount of sucrose fatty acid ester having an HLB value of at least 10 and a specified amount of polyhydric alcohol fatty acid ester having the unsaturated fatty acid radical. Therefore the emulsion of this invention cannot be produced when only one of the above emulsifiers is used or when the amount of the emulsifier is outside the specified range.

The product of this invention is considered unique because it is possible to effect a smooth transfer from the water-in-oil type to an oil-in-water type and it is surmised that this characteristic is due to the specific orientation of emulsifiers which have specific structure and specific composition in fatty acid radicals, in the interface between the oil phase and the aqueous phase.

The following examples are given to demonstrate the preparation of the emulsion of the invention disclosed herein. These examples are not intended as limitations upon the invention.

EXAMPLE 1

The aqueous phase is prepared by adding 10 kg of sucrose fatty acid ester having an HLB value of 11 to 150 kg of water and thereafter heating the resulting mixture to 60°C with agitation to dissolve the emulsifier in water. The oil phase is prepared by adding 10 kg of glycerol fatty acid ester having unsaturated fatty acid radical, to 820 kg of the melted fat of hardend fish oil (melting point 32°C).

Then the aqueous phase is mixed with the oil phase and the resulting mixture is admitted into a "Votator" with agitation at 60°C. The mixture is rapidly cooled to 18°C and plasticized by passing through a "Votator" to produce the finished product.

The composition of the sucrose fatty acid ester and glycerol fatty acid ester is as follows:

(1) Sucrose fatty acid ester    HLB about 11

| Composition of combined fatty acid | | Composition of ester | |
|---|---|---|---|
| Stearate about 70% | Palmitate about 30% | Monoester about 50% | Di- and Tri-esters about 50% |

(2) Glycerol fatty acid ester    M.P.58°C, S.V.162, I.V.35

| Composition of combined fatty acid | | | | Composition of ester | |
|---|---|---|---|---|---|
| Palmitate about 30% | Stearate about 20% | Oleate about 45% | Linoleate about 5% | Monoester about 90% | Di- and Tri-esters about 10% |

The emulsion obtained in Example 1 is whipped at high speed by using a "Hovert-Mixer". The result of whipping is as follows.

| Agitation time | Starting | 30 seconds | 1 minute | 2 minutes | 3 minutes |
|---|---|---|---|---|---|
| Gravity | 0.91 | 0.72 | 0.63 | 0.49 | 0.42 |
| Type of emulsion | w/o | o/w | o/w | o/w | o/w |

The above table shows that the water-in-oil emulsion of this invention is changed to an oil-in-water emulsion in 30 seconds.

COMPARATIVE EXAMPLE 1a

The procedure of Example 1 is followed, but sucrose fatty acid ester having an HLB value of about 7 is used instead of sucrose fatty acid ester having an HLB value of about 11. Consequently although a water-in-oil emulsion is produced, the phases cannot be reversed by whipping under the conditions of Example 1.

The composition of sucrose fatty acid ester used in this example is as follows:

| Composition of combined fatty acid | | Composition of ester | |
|---|---|---|---|
| Stearate about 70% | Palmitate about 30% | Monoester about 40% | Di- and Tri-esters about 60% |

COMPARATIVE EXAMPLE 1b

The procedure of Example 1 is followed but glycerol fatty acid ester having only a saturated fatty acid radical is used instead of glycerol fatty acid ester having an unsaturated fatty acid radical. Consequently, although a water-in-oil emulsion is produced, the phases cannot be reversed by whipping under the conditions of Example 1.

The composition of the glycerol fatty acid ester used in this example is as follows.

M.P.70°C, S.V.160, I.V. not more than 3

| Composition of combined fatty acid | | Composition of ester | |
|---|---|---|---|
| Palmitate about 30% | Stearate about 70% | Monoester about 90% | Di- and Tri-esters about 10% |

The size of the fat particles, the products consistency and stability and the results of whipping tests on the emulsions of Example 1, Comparative Example 1a, and Comparative Example 1b are tabulated below.

|  |  | Example 1 | Comparative Example 1a | Comparative Example 1b |
|---|---|---|---|---|
| Size of the fat particles |  | about 2 – 3μ | about 2 – 3μ | about 2 – 3μ |
| The consistencies of the emulsion | 5°C | 75 | 73 | 76 |
|  | 10°C | 100 | 92 | 104 |
|  | 15°C | 128 | 130 | 129 |
|  | 20°C | 175 | 181 | 171 |
| Stability of the emulsion while stationary at 30°C ± 2°C |  | The fat phase and the aqueous phase are slightly separated after 5 days | The fat phase and the aqueous phase are slightly separated after 4 days | The fat phase and the aqueous phase are slightly separated after 5 days |

| The result of whipping test |  | The emulsion | Density | The emulsion type | Density | The emulsion type | Density |
|---|---|---|---|---|---|---|---|
|  | Start | w/o | 0.91 | w/o | 0.91 | w/o | 0.91 |
|  | 30 sec | o/w | 0.72 | w/o | 0.81 | w/o | 0.85 |
|  | 1 min | o/w | 0.63 | w/o | 0.73 | w/o | 0.69 |
|  | 2 min | o/w | 0.49 | w/o | 0.65 | w/o | 0.59 |
|  | 3 min | o/w | 0.42 | w/o | 0.49 | w/o | 0.53 |

The consistency of each sample is determined by using an A.S.T.M.D-517-60T cone penetrometer, with a cone angle of 60°, in which the total load of cone plus rod is 121 grams and the reading penetration value by a 1/10 mm scale unit for a period of 5 seconds after the pointed end of the cone has touched the surface of the emulsion.

It is shown by the above table that the emulsion of Example 1 has the same size of fat particles, the same stability and the same consistency as the emulsions of Comparative Example 1a and 1b but the result of the whipping test on the emulsion of Example 1 is different from those on the emulsions of Comparative Examples 1a and 1b. The phases of the emulsion of Example 1 are reversed by whipping, while the phases of the emulsions of Comparative Examples 1a and 1b cannot be reversed.

COMPARATIVE EXAMPLE 1c

The procedure of Example 1 is followed but the mixture, which is produced by mixing the oil phase and the aqueous phase and admitted into Votator with agitation at 60°C, is rapidly cooled to 24°C and plasticized by passing through a "Votator" to produce the finished product.

The size of the fat particles, consistency, stability and the results of the whipping test on the resulting emulsion of this Example are tabulated below in comparison with the emulsion of Example 1.

|  |  | Example 1 | Comparative Example 1c |
|---|---|---|---|
| Size of the fat particles |  | about 2 – 3μ | about 20 – 40μ |
| The consistencies of the emulsion | 5°C | 75 | 100 |
|  | 10°C | 100 | 161 |
|  | 15°C | 128 | 222 |
|  | 20°C | 175 | ∞ |
| Stability of the emulsion while stationary at 30°C ± 2°C |  | The fat phase and the aqueous phase are slightly separated after 5 days | The fat phase and the aqueous phase are completely separated after 2.5 hours |

| Result of the whipping test |  | The emulsion type | Density | The emulsion type | Density |
|---|---|---|---|---|---|
|  | Start | w/o | 0.91 | w/o | 0.91 |
|  | 30 sec | o/w | 0.72 | o/w | 0.80 |
|  | 1 min. | o/w | 0.63 | o/w | 0.71 |
|  | 2 min | o/w | 0.49 | o/w | 0.69 |
|  | 3 min | o/w | 0.42 | o/w | 0.73 |

| Character of the oil-in-water emulsion after changing the phase | | | |
|---|---|---|---|
| Size of the fat particles | about 1 – 2μ | about 7 – 10μ |
| Presentation of original consistency | Good | The fat phase and the aqueous phase are easily separated. |
| Stability of the emulsion | Density becomes 0.5 after an elapse of 1 day from the whipping. Air in the emulsion decreases only very slightly. | Density becomes 0.88 1 day after the whipping. The phases are easily separated. Air in the emulsion decreases considerably. |

EXAMPLE 2

The aqueous phase is prepared by adding 17 kg of sucrose fatty acid ester having an HLB value of 14 and 13 kg of skimmed milk to 250 kg of water and dissolving the former into the latter. The oil phase is prepared by adding 10 kg of sorbitan fatty acid ester having unsaturated fatty acid radical to 710 kg of melted fat mixture of hardened soybean oil (melting point 36°C) 80% and soybean oil 20%.

Then the aqueous phase is mixed with the oil phase at 50°C and the resulting mixture is admitted into a "Perfector" with agitation. The mixture is rapidly cooled and plasticized by passing through the "Perfector" to produce the finished product.

The composition of the sucrose fatty acid ester and sorbitan fatty acid ester is as follows:

| (1) Sucrose fatty acid ester | | HLB 14 | |
|---|---|---|---|
| Composition of combined fatty acid | | Composition of ester | |
| Stearate about 30% | Palmitate about 70% | Monoester about 70% | Di- and Tri-esters about 30% |

| (2) Sorbitan fatty acid ester | | | |
|---|---|---|---|
| Composition of the combined fatty acid | | Composition of the ester | |
| Oleate about 85% | Stearate about 15% | Monoester about 60% | Di- and Tri-esters about 40% |

The resulting emulsion has dispersed particles $2.5\mu$–$3.5\mu$ in size. The emulsion is whipped at 200 r.p.m. in an "Hovert-Mixer". The result of whipping is as follows:

| Agitation time | Starting | 30 sec. | 1 min. | 2 min. | 3 min. |
|---|---|---|---|---|---|
| Density | 0.95 | 0.70 | 0.60 | 0.51 | 0.47 |
| Type of emulsion | w/o | w/o | o/w | o/w | o/w |

COMPARATIVE EXAMPLES 2a and 2b

Two samples of the emulsion of Example 2 are whipped at 100 r.p.m. and 50 r.p.m. respectively in an "Hovert-Mixer". The result of whipping is as follows:

| | Agitation time | | Starting | 30 sec. | 1 min. | 2 min. | 3 min. | 10 min. |
|---|---|---|---|---|---|---|---|---|
| Comparative Example 2a | Agitating at 100 r.p.m. | Density | 0.95 | 0.90 | 0.78 | 0.72 | 0.68 | — |
| | | The type of emulsion | w/o | w/o | w/o | w/o | o/w | — |
| Comparative Example 2b | Agitating at 50 r.p.m. | Density | 0.95 | 0.95 | 0.94 | 0.93 | 0.93 | 0.91 |
| | | The type of emulsion | w/o | w/o | w/o | w/o | w/o | w/o |

It is obvious from the above table that the phases of the emulsion of this invention connot be reversed by agitating at so low speed as indicated in the above table.

EXAMPLE 3

The aqueous phase is prepared by adding and dissolving 37 kg of sucrose fatty acid ester having an HLB of about 13 and 3 kg of sodium caseinate to 250 kg of water. Then the aqueous phase is mixed with 250 kg of soybean oil with agitation at 60°C and the resulting mixture is passed through a homogenizer under a pressure of 150 kg/cm$^2$ to produce an oil-in-water emulsion which has oil particles 1 – $2\mu$ in size. The oil phase is prepared separately by adding 20 kg of propylene glycol fatty acid ester having unsaturated fatty acid radical to 440 kg of the melted fat mixture which consists of 90% hardened soybean oil (melting point 32°C) and 10% coconut oil, and dissolving these ingredients.

The oil-in-water emulsion is mixed with the oil phase and the resulting mixture is passed through a "Perfector" with agitation and the mixture is thereby cooled rapidly and plasticized to produce the finished product, which is oil-in-water-in-oil emulsion.

The composition of sucrose fatty acid ester and propylene glycol fatty acid ester is as follows.

| (1) Sucrose fatty acid ester | | HLB 13 | |
|---|---|---|---|
| Composition of combined fatty acid | | Composition of ester | |
| Stearic acid about 30% | Palmitic acid about 70% | Monoester about 60% | Di- and Tri-esters about 40% |

| (2) Propylene glycol fatty acid ester | | | |
|---|---|---|---|
| Composition of combined fatty acid | | Composition of ester | |
| Oleic acid about 90% | Stearic acid about 10% | Monoester about 90% | Di- and Tri-esters about 10% |

The particle size of the dispersed aqueous phase in the finished product is 2 – $4\mu$. The finished product is whipped at a speed of 200 r.p.m. in Hovert-Mixer. The result of whipping is as follows:

| Agitation time | Start | 30 sec. | 1 min. | 2 min. | 3 min. |
|---|---|---|---|---|---|
| Density | 0.95 | 0.69 | 0.58 | 0.48 | 0.43 |
| The type of emulsion | o/w/o | o/w/o | o/w | o/w | o/w |

EXAMPLE 4

The aqueous phase is prepared by adding 30 kg of sucrose fatty acid ester having an HLB of from about 15, to 400 kg of water and dissolving. The oil phase is prepared by adding 10 kg of glycerol fatty acid ester to 560 kg of the fat mixture which consists of 50% soybean oil and 50% hardened fish oil (melting point 36°C).

The aqueous phase is mixed with the oil phase and then the resulting mixture is passed through a "Votator" and thereby cooled rapidly and plasticized to obtain a water-in-oil emulsion product.

The particle size of the aqueous phase in the product is 2 – 7μ, average 4 – 5μ.

The composition of sucrose fatty acid ester and glycerol fatty acid ester is as follows:

(1) Sucrose fatty acid ester    HLB 15

| Composition of the combined fatty acid | | Composition of the ester | |
| --- | --- | --- | --- |
| Oleic acid about 70% | Stearic acid about 30% | Monoester about 50% | Di- and Tri-esters about 50% |

(2) Glycerol fatty acid ester

| Composition of the combined fatty acid | | | | Composition of the ester | |
| --- | --- | --- | --- | --- | --- |
| Linoleic acid | Oleic acid | Stearic acid | Palmitic acid | Monoester | Di- and Tri-esters |
| about 75% | 20% | about 5% | | about 90% | about 10% |

The product is whipped at a speed of 200 r.p.m. in a "Hovert-Mixer". The result of whipping is as follows:

| Agitation time | Starting | 30 sec. | 1 min. | 2 min. | 3 min. |
| --- | --- | --- | --- | --- | --- |
| Density | 0.97 | 0.78 | 0.62 | 0.60 | 0.60 |
| The type of emulsion | w/o | w/o | o/w | o/w | o/w |

What we claim is:

1. An edible water-in-oil emulsion, which is stable during storage and carriage and the phase of which can be reversed by mechanical working to form an oil-in-water emulsion, said water-in-oil emulsion comprising about 50 – 95% by weight of a continuous oil phase, about 5 – 50% by weight of a dispersed aqueous phase, a polyhydric alcohol fatty acid ester having a substantial proportion of a polyhydric alcohol unsaturated fatty acid ester in an amount of about 0.25 – 2.5% by weight of said water-in-oil emulsion, and a sucrose fatty acid ester having an HLB value of at least 10 in an amount of about 0.5 – 5% by weight of said water-in-oil emulsion.

2. The edible water-in-oil emulsion of claim 1, wherein the particle size of the dispersed aqueous phase is about 2 – 20 microns.

3. The edible water-in-oil emulsion of claim 1, wherein the sucrose fatty acid ester is composed of at least 50% monoester, together with small amounts of diester and triester.

4. The edible water-in-oil emulsion of claim 1, wherein the combined fatty acid of the polyhydric alcohol fatty acid ester contains at least 50% unsaturated fatty acid.

5. The edible water-in-oil emulsion of claim 1, wherein the combined polyhydric alcohol of the polyhydric alcohol fatty acid ester is selected from a group consisting of glycerin, propylene glycol and sorbitan.

* * * * *